No. 888,021.
PATENTED MAY 19, 1908.
H. R. LAW.
ILLUSION APPARATUS.
APPLICATION FILED MAY 22, 1907.
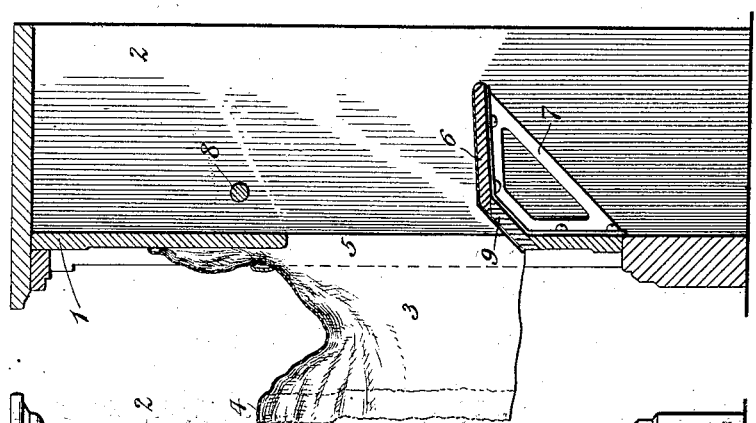
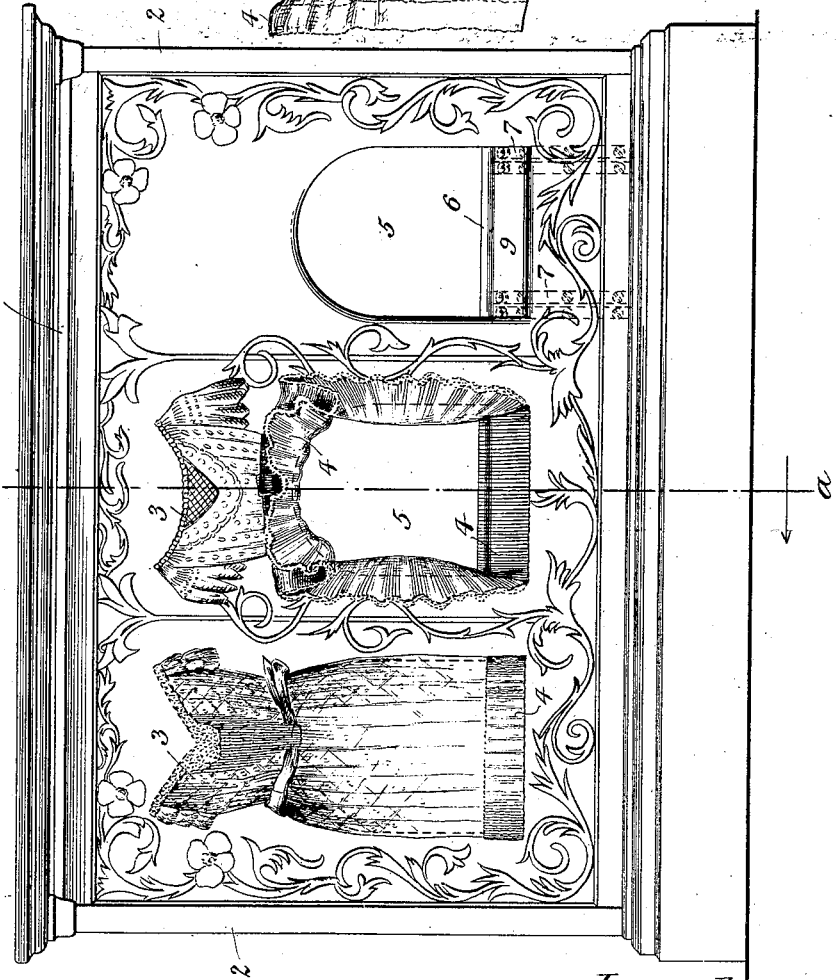
Witnesses:
Inventor:

UNITED STATES PATENT OFFICE.

HARRY R. LAW, OF NEW YORK, N. Y.

ILLUSION APPARATUS.

No. 888,021.  Specification of Letters Patent.  Patented May 19, 1908.

Application filed May 22, 1907. Serial No. 375,045.

*To all whom it may concern:*

Be it known that I, HARRY R. LAW, a citizen of the United States, residing in the borough of Manhattan, city, county, and State of New York, have invented certain new and useful Improvements in Illusion Apparatus, of which the following is a specification.

This invention relates to certain improvements in illusion apparatus, such as is particularly designed for theatrical use, and the object of the invention is to provide an apparatus of this general character of a simple and comparatively inexpensive nature and of a compact and strong construction, by the employment of which novel and entertaining stage effects may be attained.

The invention consists in certain novel features of the construction, and combination and arrangements of the several parts of the improved illusion apparatus, whereby certain important advantages are attained and the devices are rendered simpler, inexpensive and otherwise better adapted and more convenient for use, all as will be hereinafter fully set forth.

The novel features of the invention will be carefully defined in the claims.

In the accompanying drawings which serve to illustrate my invention—Figure 1 is a face or front view of the improved illusion apparatus and—Fig. 2 is a section taken vertically through the same in the plane indicated by line *a—a* in Fig. 1.

As shown in these views the improved apparatus comprises a flattened screen or support 1, made to represent a show case or the like, and of such dimensions as to be capable of being readily handled, so that it may be conveniently moved about, on and off the stage. As herein shown, said screen 1 has end portions 2, 2 at right angles to it and adapted to support it in erect position for use.

The front face of the screen may be ornamented in any desired way, and upon it are arranged gowns or dresses 3, 3 or suitably formed draperies representing or appearing to be such gowns or dresses, the same being attached at their upper parts to said front face of the screen 1 but having their lower parts 4, loose from the screen and made with some fullness, so that said loose lower portions 4 of the draperies 3 may be extended out in front of the said front face of the screen as shown in Fig. 2. The said screen 1 is provided at its lower part with openings 5, which are arranged behind and normally concealed from view by the loose lower portions 4, 4 of the gowns or draperies 3, 3, and at the rear of each such opening 5, is arranged a seat 6, having suitable braces 7, beneath it for supporting it at the rear side of the screen 1. Above the seats 6, is extended a bar 8, held at its ends to the ends 2, 2 of the screen or otherwise supported in convenient position to be gripped and held by the hands of the performers sitting upon the seats 6, 6, so that the performers may hold themselves in position during the use of the improved illusion apparatus.

When the screen 1 is brought upon the stage with its front surface exposed, it gives the appearance of a number of gowns or dresses hanging upon a support or within a case, and in the use of the improved apparatus, the performers being seated upon the seats 6, 6, first pass their limbs through the openings 5, 5, and down beneath the lower edges of the loose parts 4, 4 of the gowns or draperies, and while holding upon the bar 8 go through the motions necessary to give from the auditorium the appearance and movements of a dance performance, the upper parts of the performers' bodies being of course concealed behind the screen. After the dance performance has been concluded, the performers release their holds upon the bar 8 and permit themselves to fall or slide entirely through the openings 5, 5, the fullness at the lower parts of the gowns or draperies 3, 3 permitting the performers to lift said full or loose lower portions 4, 4 and thus to reach the stage, so that a further dance performance may be given without the use of the screen. To permit the performers to fall or slide through the openings 5, 5, the forward parts of the seats 6, 6 have downwardly inclined or beveled portions as seen at 9, which may be cushioned, if desired.

The improved apparatus constructed according to my invention is of an extremely simple and inexpensive nature and is particularly well adapted for use by reason of the novel and startling effect, the first impression of the audience being of dresses or gowns going through the movements of a dance performance, followed by the appearance of the performers themselves, and it will be obvious from the above description that the apparatus is capable of some modification without material departure from the principles and spirit of the invention, and for this reason I do not desire to be understood as limiting myself to the precise form and arrangement of the several parts of the device as herein set forth in carrying out my invention in practice.

Having thus described my invention what I claim and desire to secure by Letters Patent is—

1. An illusion apparatus comprising a screen adapted to be supported in erect position and provided with an opening, and a drapery held upon the screen and extended across said opening.

2. An illusion apparatus comprising a screen adapted to be supported in erect position and provided with an opening, and a drapery held upon the screen and having at its lower part a fullness extended across said opening in the screen.

3. An illusion apparatus comprising a screen adapted to be supported in erect position and provided with an opening, a seat horizontally extended from the screen at the bottom of the opening, and a drapery held upon the screen and extended across said opening.

4. An illusion apparatus comprising a screen adapted to be supported in erect position and provided with an opening, a seat horizontally extended from the screen at the bottom of the opening, a bar extended behind the screen and above said opening, and a drapery held upon the screen and extended across said opening.

5. An illusion apparatus comprising a screen adapted to be supported in erect position and provided with an opening, a bar extended behind the screen and above said opening, and a drapery held upon the screen and extended across said opening.

In witness whereof I have hereunto signed my name this 20th day of May 1907, in the presence of two subscribing witnesses.

HARRY R. LAW.

Witnesses:
J. D. CAPLINGER,
WILLIAM J. FIRTH.